United States Patent
Yamaguchi

(10) Patent No.: US 8,215,881 B2
(45) Date of Patent: Jul. 10, 2012

(54) ROTARY CUTTING TOOL AND METHOD FOR MANUFACTURING SUCH A ROTARY CUTTING TOOL

(75) Inventor: Hitoshi Yamaguchi, Taka (JP)

(73) Assignee: Sakai Threading Tool Co., Ltd., Osaka (JP)

(*) Notice: Subject to any disclaimer, the term of this patent is extended or adjusted under 35 U.S.C. 154(b) by 1028 days.

(21) Appl. No.: 12/087,875

(22) PCT Filed: Jan. 15, 2007

(86) PCT No.: PCT/JP2007/050856
§ 371 (c)(1),
(2), (4) Date: Jul. 16, 2008

(87) PCT Pub. No.: WO2007/083778
PCT Pub. Date: Jul. 26, 2007

(65) Prior Publication Data
US 2010/0150677 A1     Jun. 17, 2010

(30) Foreign Application Priority Data
Jan. 17, 2006   (JP) .................. 2006-008836

(51) Int. Cl.
*B23G 5/06*   (2006.01)
(52) U.S. Cl. ........... 408/222; 29/428; 148/276; 470/198
(58) Field of Classification Search ............... 408/215, 408/216, 219, 222; 29/458; 148/276; 470/198; B23G 5/06
See application file for complete search history.

(56) References Cited

U.S. PATENT DOCUMENTS

| | | | | |
|---|---|---|---|---|
| 4,708,542 A * | 11/1987 | Emanuelli | ..................... | 408/144 |
| 4,744,241 A * | 5/1988 | Mayer | .............................. | 73/104 |
| 5,033,919 A * | 7/1991 | Choe | ............................ | 408/217 |
| 5,250,367 A * | 10/1993 | Santhanam et al. | .......... | 428/698 |
| 5,316,520 A * | 5/1994 | Green | ............................. | 470/18 |
| 5,491,030 A * | 2/1996 | Asai et al. | ..................... | 428/433 |
| 5,573,335 A * | 11/1996 | Schinazi | ....................... | 374/141 |
| 5,597,272 A * | 1/1997 | Moriguchi et al. | ........... | 407/119 |

(Continued)

FOREIGN PATENT DOCUMENTS

JP     59038376 A  *  3/1984

(Continued)

OTHER PUBLICATIONS

International Search Report issued Feb. 20, 2007 in International (PCT) Application No. PCT/JP2007/050856 of which the present application is the U.S. National Stage.

*Primary Examiner* — Eric A Gates
(74) *Attorney, Agent, or Firm* — Wenderoth, Lind & Ponack, L.L.P.

(57) ABSTRACT

A rotary cutting tool is provided which is less likely to cause chips to get stuck, and which can be manufactured at a low cost. The rotary cutting tool includes a body having a relief surface (6) and a rake face (7) which is connected to the relief surface (6). An oxide film (9) is formed on the rake face (7) by oxidizing the surface of the body, and a hard film (8) is formed on the relief surface (6) and the oxide film (9), The hard film (8) is made of a metal carbide, a metal nitride, a metal carbonitride, or a solid solution thereof.

10 Claims, 4 Drawing Sheets

U.S. PATENT DOCUMENTS

| | | | | |
|---|---|---|---|---|
| 5,641,251 A * | 6/1997 | Leins et al. | | 408/144 |
| 6,015,614 A * | 1/2000 | Ruppi | | 428/335 |
| 6,217,267 B1 * | 4/2001 | Sugano et al. | | 408/222 |
| 7,144,208 B2 * | 12/2006 | Henderer et al. | | 408/144 |
| 7,147,413 B2 * | 12/2006 | Henderer et al. | | 408/144 |
| 7,442,128 B2 * | 10/2008 | Leonard | | 470/198 |
| 7,588,620 B2 * | 9/2009 | Tanibuchi | | 75/236 |
| 7,789,598 B2 * | 9/2010 | Tanibuchi et al. | | 407/119 |
| 7,815,512 B2 * | 10/2010 | Nakajima et al. | | 470/204 |
| 7,950,880 B2 * | 5/2011 | Henderer et al. | | 408/222 |
| 8,007,929 B2 * | 8/2011 | Itoh et al. | | 428/701 |
| 2003/0165796 A1 * | 9/2003 | Carmichael et al. | | 433/174 |
| 2004/0105730 A1 | 6/2004 | Nakajima | | |
| 2004/0247406 A1 * | 12/2004 | Malagnino et al. | | 408/222 |
| 2005/0187026 A1 * | 8/2005 | Henderer et al. | | 470/198 |
| 2005/0220546 A1 * | 10/2005 | Yamagata et al. | | 407/119 |
| 2007/0207865 A1 * | 9/2007 | Glimpel et al. | | 470/198 |
| 2007/0248424 A1 * | 10/2007 | Omori et al. | | 407/113 |
| 2008/0131218 A1 * | 6/2008 | Omori et al. | | 407/114 |
| 2010/0054871 A1 * | 3/2010 | Prakash | | 407/11 |
| 2010/0119315 A1 * | 5/2010 | Kathrein | | 407/119 |
| 2010/0166512 A1 * | 7/2010 | Tanibuchi | | 407/119 |
| 2011/0020087 A1 * | 1/2011 | Yamamoto et al. | | 408/219 |
| 2011/0262233 A1 * | 10/2011 | Martensson | | 407/119 |

FOREIGN PATENT DOCUMENTS

| | | | |
|---|---|---|---|
| JP | 59041466 A * | 3/1984 | |
| JP | 60238481 A * | 11/1985 | |
| JP | 60-242907 | 12/1985 | |
| JP | 62213920 A * | 9/1987 | |
| JP | 01252306 A * | 10/1989 | |
| JP | 3-113703 | 11/1991 | |
| JP | 06246512 A * | 9/1994 | |
| JP | 3-7402 | 1/1997 | |
| JP | 2001138138 A * | 5/2001 | |
| JP | 2004-174698 | 6/2004 | |
| WO | WO 2008149465 A1 * | 12/2008 | |

* cited by examiner (a)

(b)

(c)

ROTARY CUTTING TOOL AND METHOD FOR MANUFACTURING SUCH A ROTARY CUTTING TOOL

TECHNICAL FIELD

This invention relates to a rotary cutting tool and a method of manufacturing the rotary cutting tool.

BACKGROUND ART

When forming an internal thread in the inner surface of a starting hole formed in a workpiece by cutting the inner surface of the starting hole with a tap, chips may get stuck between the workpiece and the tap, thereby damaging the tap or resulting in poor accuracy of the internal thread. Particularly in the case of a tap including a hard film such as titanium nitride formed on the surface of the body forming the tap for improved durability, long continuous chips tend to form which tend to get stuck.

In order to prevent chips from getting stuck, Patent document 1 proposes a tap in which a hard film formed on the surface of the body is removed from the rake faces to expose the body so that chips contact the surface of the body. This prevents the formation of long continuous chips, and thus prevents chips from getting stuck.

This tap is manufactured by forming rake faces and relief surfaces on the body, forming a hard film on the surface of the body, and removing the hard film from the rake faces. The hard film is removed by separately grinding the rake faces of the individual taps. This increases the manufacturing cost of the tap.

[Patent document 1] JP Patent Publication 2004-174698

DISCLOSURE OF THE INVENTION

[Object of the Invention]

An object of the invention is to provide a rotary cutting tool which is less likely to cause chips to get stuck, and which can be manufactured at a low cost.

[Means to Achieve the Object]

In order to achieve this object, the present invention provides a rotary cutting tool comprising a body having a relief surface and a rake face which is connected to the relief surface, wherein an oxide film is formed on the rake face by oxidizing the surface of the body, and wherein a hard film is formed on the relief surface and the oxide film, the hard film comprising a metal carbide, a metal nitride, a metal carbonitride, or a solid solution thereof.

The rake face is preferably matt-finished. The rotary cutting tool may be a tap.

From another aspect of the invention, there is provided a method of manufacturing a rotary cutting tool comprising a body, the method comprising the steps of forming a rake face on the body, oxidizing, after forming the rake face, a portion of the surface of the body including the rake face to form an oxide film thereon, cutting, after forming the oxide film, an outer periphery of the body to form a relief surface, coating, after forming the relief surface, a portion of the surface of the body including the relief surface with a metal carbide, a metal nitride, a metal carbonitride, or a solid solution thereof.

In this method, before forming the oxide film, the rake face may be roughened by a matt finish step. The matt finish step may comprise the step of roughening the rake face by shot blasting.

[Advantages of the Invention]

In the rotary cutting tool according to this invention, since a hard film is formed on the oxide film on the rake face, the hard film easily peel off the oxide film by contact with chips, thereby allowing the oxide film to be exposed easily. By contact with the thus exposed oxide film, chips are broken into small pieces. This prevents the formation of long continuous chips, thus preventing chips from getting stuck between the workpiece and the tool. Also, because it is not necessary to remove the hard film from the rake face, the tool can be manufactured at a low cost.

By matt finishing the rake face of the body, the hard film can be more easily peeled off the oxide film on the surface of the body, so that the oxide film can be more easily exposed. This in turn more reliably prevents the formation of long continuous chips, thereby more effectively preventing chips from getting stuck.

DESCRIPTION OF NUMERALS

6. Relief surface
7. Rake face
8. Hard film
9. Oxide film
10. Body

[Best Mode For Embodying The Invention]

Figure 1:
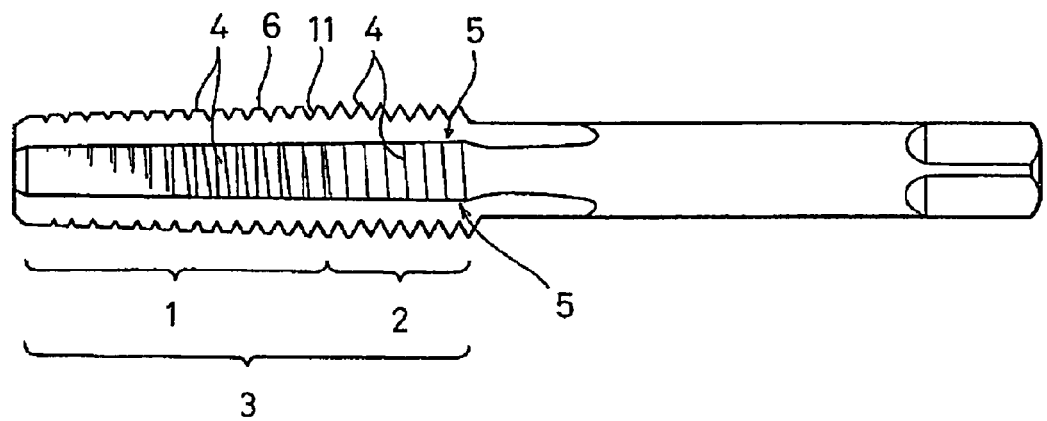
FIG. 1 shows the entire rotary cutting tool embodying the present invention.
Figure 6:
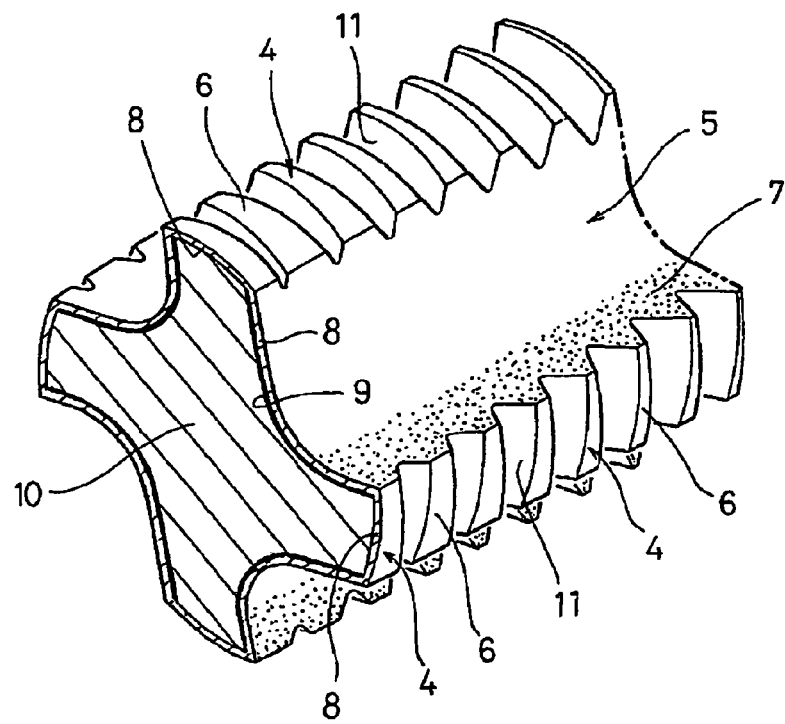
FIG. 6 is an enlarged perspective view showing how a hard film is formed on the surface of the body of FIG. 5.

FIG. 1 shows a rotary cutting tool embodying the invention. This tool is a tap for cutting, by turning, the inner wall of a starting hole formed in a workpiece, thereby forming an internal thread in the starting hole. This tool includes a thread portion 3 comprising a leading portion 1 that first engages and cuts the workpiece, and a complete thread portion 2 continuous with the leading portion 1. On the outer periphery of the thread portion 3, a thread 4 and flutes 5 that extend across the thread 4 are formed. As shown in FIG. 6, the thread 4 at the leading portion 1 has a relief surface 6 at its apex. A rake face 7 is formed on the inner surface of each flute 5 so as to be continuous with the relief surface 6.

This tap comprises a body made of high-speed steel. As shown in FIG. 6, a hard film 8 is formed at least on the surface of the thread 4. The hard film 8 may be made of a metal carbide such as TiC, a metal nitride such as TiN or TiAlN, a metal carbonitride such as TiCN, or a solid solution thereof. On the surface of each flute 5, an oxide film 9 is formed by oxidizing the surface of the body (shown by solid lines in the figures). The hard film 8 is also formed on the oxide film 9. The oxide film 9 may be made of FeO, $Fe_2O_3$ or $Fe_3O_4$. But $Fe_3O_4$ is preferable because of its excellent lubricating properties.

The surface of each rake face 7 at the leading portion 1 is matt-finished.

Figure 2:
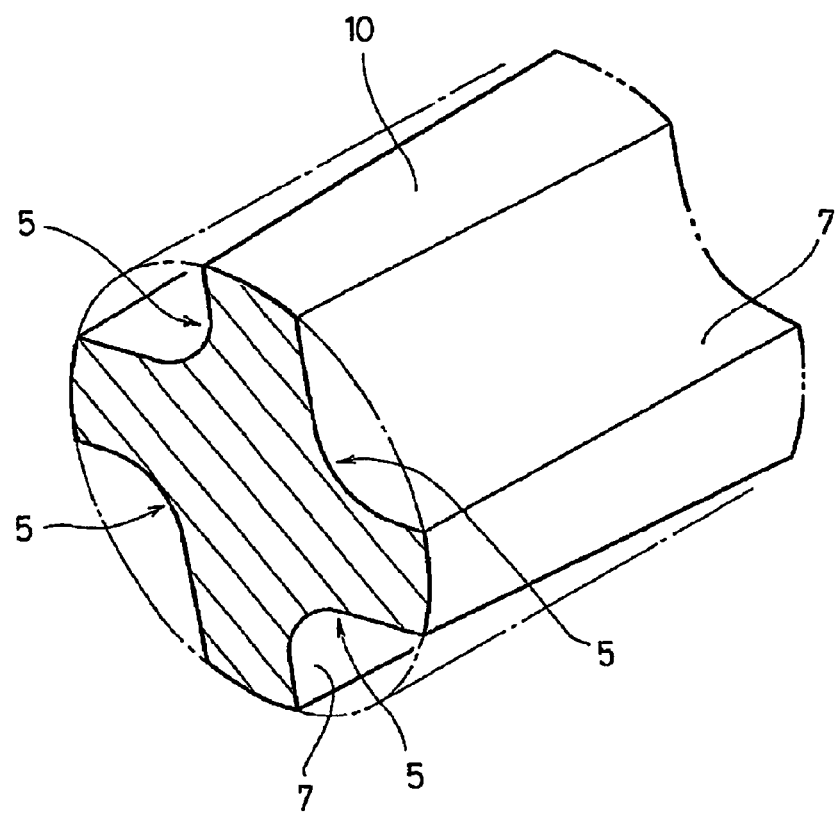
FIG. 2 is a partial enlarged perspective view of the tool of FIG. 1 showing how rake faces are formed on the surface of the body of the tool.
Figure 3:
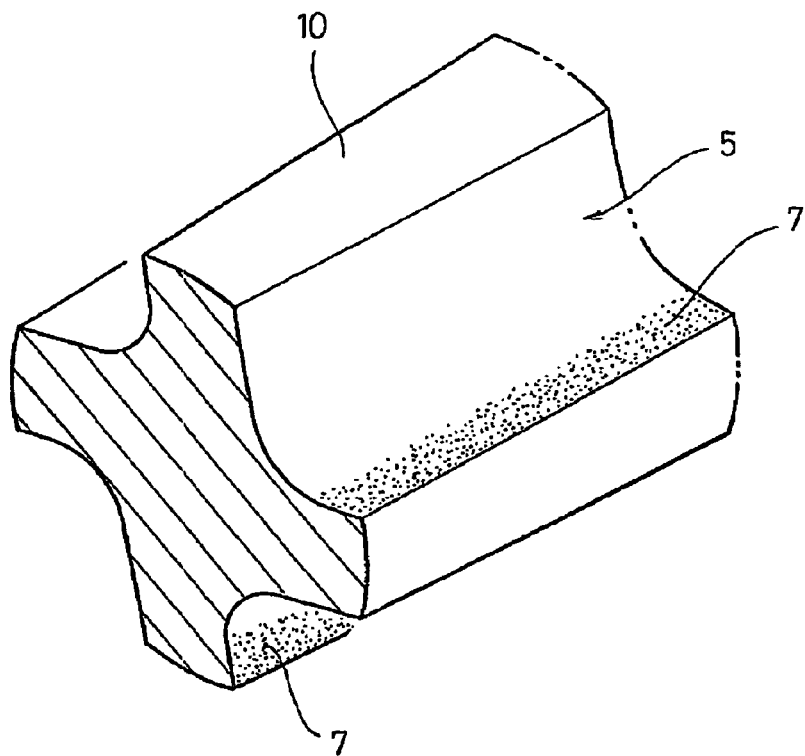
FIG. 3 is an enlarged perspective view showing how the body of FIG. 2 is matt-finished.
Figure 4:
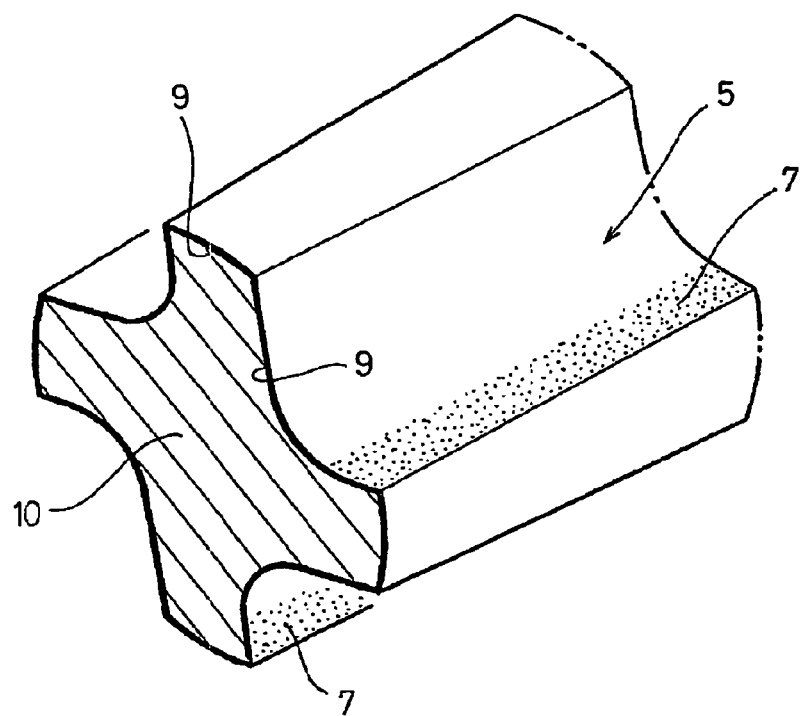
FIG. 4 is an enlarged perspective view showing how an oxide film is formed on the surface of the body of FIG. 3.
Figure 5:
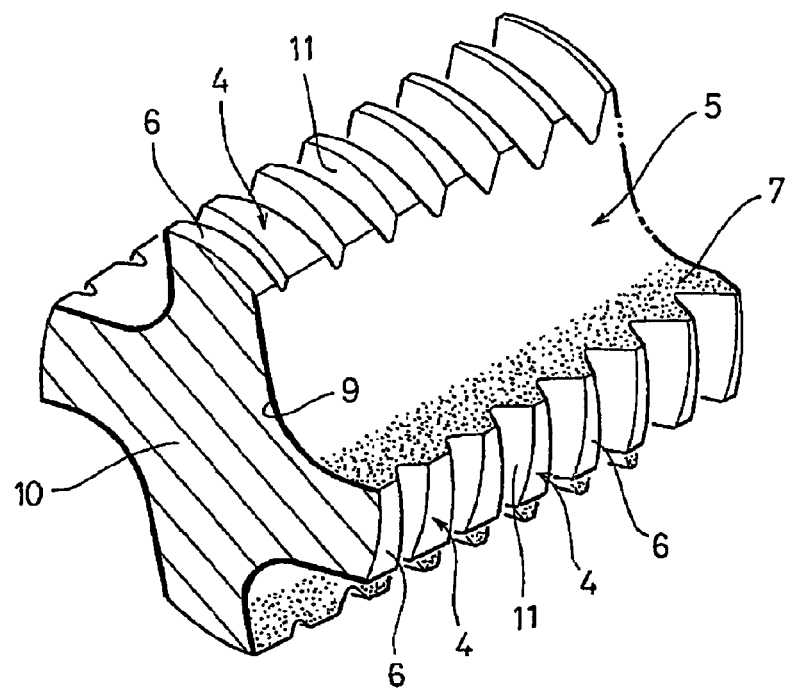
FIG. 5 is an enlarged perspective view showing how a relief surface is formed on the outer periphery of the body of FIG. 4.

This tap can be manufactured e.g. as shown in FIGS. 2 to 6. First, the rake faces 7 are formed by grinding the body 10 (FIG. 2). The surface of the body forming the rake faces 7 is then roughened by shot blasting so that the arithmetic mean roughness Ra of the surface of the body forming the rake faces 7 satisfies the relation 0.1 μm<Ra<5.0 μm (FIG. 3). Thereafter, steam treatment is carried out to oxidize the surface of the body including the rake faces 7, thereby forming the oxide film 9 thereon (FIG. 4). The outer periphery of the body 10 is then ground to form the thread 4, and the apex of the thread 4 is ground to form the relief surface 6 (FIG. 5). At this time, the oxide film 9 is removed from the outer periphery of the body 10. Finally, a metal carbide, a metal nitride, a metal carbonitride or two or more of them are physically deposited on the surface of the body including the relief surface 6 to form the hard film 8 (FIG. 6).

In this tap, since the hard film 8 of the rake faces 7 is formed on the oxide film 9, when the hard film 8 contacts chips, the hard film 8 tends to peel off the oxide film 9, thus exposing the oxide film 9. Because chips now contact the oxide film 9, the oxide film 9 serves to prevent the formation of long chips, thus preventing chips from getting stuck between the workpiece and the tap.

Because the hard film 8 is formed on the surface of the thread 4, this tap has high durability and can form internal threads of stable quality.

Because the hard films 8 and the oxide films 9 can be formed simultaneously on a plurality of taps, and it is not necessary to remove the hard films 8 from the rake faces 7 of the individual taps, such taps can be manufactured at a low cost.

Because the surface of the body including the rake faces 7 is matt-finished, the hard film 8 can more easily peel off the oxide film 9 on the surface of the body, so that the oxide film 9 can be more easily exposed. This makes it possible to more reliably prevent the formation of long chips, and thus to prevent chips from getting stuck between the tap and the workpiece.

Preferably, the matt-finished surface of the body including the rake faces 7 has an arithmetic mean roughness Ra that satisfies the relation 0.1 μm<Ra<5.0 μm in the axial direction of the tap. By setting this value higher than 0.1 μm, the hard film 8 can easily and reliably peel off the oxide film 9. By setting this value lower than 5.0 μm, it is possible to reduce the cutting torque. Further, the surface of the body including the rake faces 7 has preferably an arithmetic mean roughness Ra that satisfies the relation 0.1 μm<Ra<5.0 μm in the direction, perpendicular to the axis of the tap. With this arrangement, the hard film 8 can more easily peel off.

The tap of the embodiment comprises a body made of high-speed steel to ensure toughness of the body while minimizing the manufacturing cost of the tool. But the body may be made of any other ferrous material.

In the embodiment, after forming the thread 4 by cutting the outer periphery of the body 10, the relief surface 6 is formed by grinding the apex of the thread 4. But the order of forming the thread 4 and the relief surface 6 may be reversed. That is, after forming the relief surface 6 by grinding the outer periphery of the body 10, the outer periphery of the body 10 may be further ground to form the thread 4.

In the figures, the surface of each flute 5 of the body at the leading portion 1 is matt-finished. But the surface of the flute 5 of the body at the complete thread portion 2 may also be matt-finished. It is only important that the rake face 7 of each flute 5 be matt-finished. In the embodiment, the surface of the body is matt-finished by shot blasting. But the matt-finished surface may be formed by any other method such as electric discharge machining.

The oxide film 9 is preferably formed over the entire surface of each flute 5 at the thread portion 3 because chips can be more easily discharged. But the oxide film 9 may be formed only on the surface of the flute 5 at the leading portion 1, or only on the rake face 7 of the flute 5. It is important that the oxide film 9 be formed on the rake faces 7.

The hard film 8 may be formed only on the thread 4 at the leading portion 1, but preferably, the hard film 8 is also formed on the thread 4 at the complete thread portion 2 for improved durability of the tap. Further, the hard film 8 may be formed only on the relief surface 6 of the thread 4, but preferably, the hard film 8 is formed both on the relief surface 6 and flank surfaces 11 for improved durability of the tap.

The rotary cutting tool of the embodiment is a tap. But the present invention is applicable to other rotary cutting tools. For example, the present invention is applicable to a reamer for cutting, by turning, the inner surface of a starting hole to finish the inner surface of the starting hole.

EXAMPLE 100 nuts were formed by cutting workpieces (nut blanks) using each of Tools 1 and 2 according to the invention and a Comparative Tool. Then, observation was made on how the hard films on the rake faces of the respective tools peeled off.

Tools 1 and 2 of the invention and Comparative Tool are nut taps for metric threads (M12×1.75). Their rake faces differ from each other as shown in Table 1.

TABLE 1

|  | Tool 1 of the invention | Tool 2 of the invention | Comparative Tool |
| --- | --- | --- | --- |
| Hard film | Yes | Yes | Yes |
| Oxide film on rake faces | Yes | Yes | No |
| Matt finish on rake faces | Yes | No | No |

As shown, for Tool 1 of the invention, after subjecting the surface of the body including the rake faces to matt finish treatment, an oxide film is formed on the rake faces, and a hard film is further formed on the oxide film. For Tool 2 of the invention, an oxide film is formed on the rake faces without subjecting the surface of the body including the rake faces to matt finish treatment, and a hard film is further formed on the oxide film. For Comparative Tool, no oxide film is formed on the rake faces, and a hard film is directly formed on the rake faces.

In Tool 1 of the invention, matt finish treatment was carried out under the following conditions:
Type: Dry air blasting
Media: Alundum A (#150)
Blasting pressure: 0.4 MPa
Blasting time: 30 minutes The roughness of the rake faces of each tool was measured. The rake faces of the Tool 1 of the invention had an arithmetic mean roughness Ra of 0.60 in the axial direction of the tap, and an arithmetic mean roughness Ra of 0.63 in the direction perpendicular to the axis of the tap. The rake faces of the Tool 2 of the invention had an arithmetic mean roughness Ra of 0.05 in the axial direction of the tap, and an arithmetic mean roughness Ra of 0.35 in the direction perpendicular to the axis of the tap. The rake faces of Comparative Tool had an arithmetic mean roughness Ra of 0.05 in the axial direction of the tap, and an arithmetic mean roughness Ra of 0.36 in the direction perpendicular to the axis of the tap.

These roughness values were measured under the following conditions:
Radius of the tip of the probe: 5 μm
Taper angle of the tip of the probe: 90°
Measuring force: 0.8 mN
Cut-off value: 0.25 mm Tools 1 and 2 of the invention and Comparative Tool all comprise a body made of high-speed steel. Their hard films are all made of TiN and have a thickness of 1 μm. The oxide films are formed by subjecting $Fe_3O_4$ to steam treatment and have a thickness of 1 μm.

The workpieces are cold-forged carbon steel wires (SWCH10R)

Figure 7:
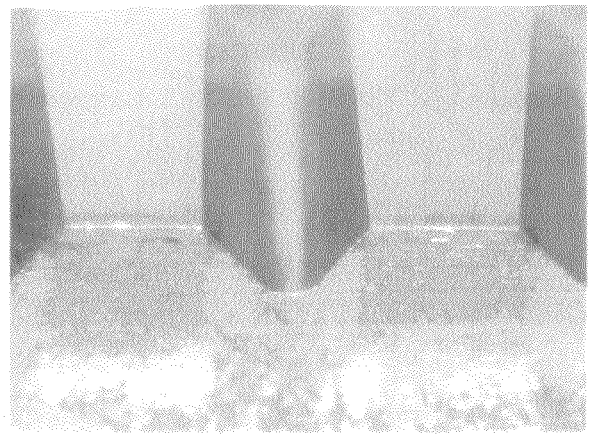
FIG. 7(a) is a photo of a rake face of Tool 1 of the invention after 100 nuts have been formed with this tool.
FIG. 7(b) is a photo of a rake face of Tool 2 of the invention after 100 nuts have been formed with this tool.
FIG. 7(c) is a photo of a rake face of Comparative Tool after 100 nuts have been formed with this tool.
Figure 7:
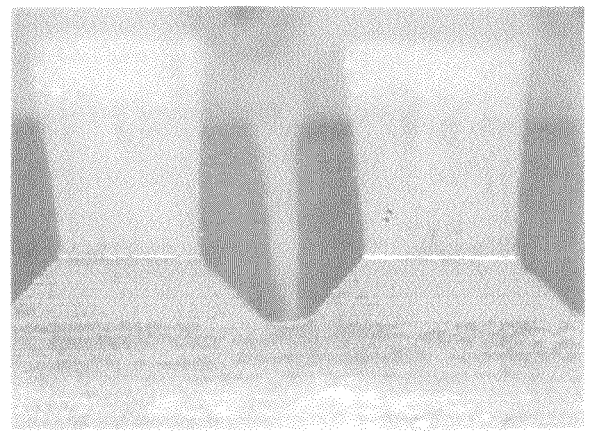
Figure 7:
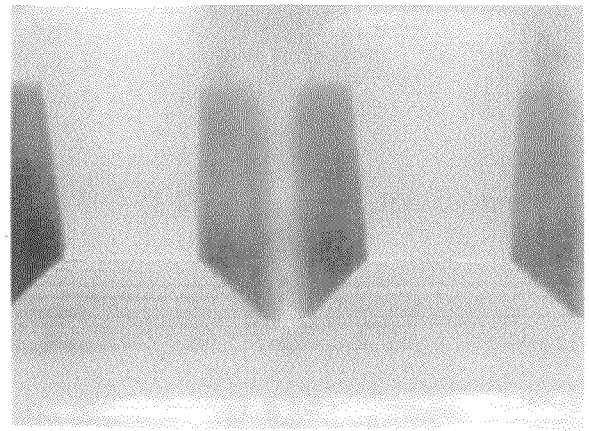

100 nuts were formed by cutting these workpieces. FIG. 7(a) to 7(c) show the results of observation of how the hard films on the rake faces of the respective tools peeled off. As shown in FIG. 7(a), for Tool 1 of the invention, the hard film on each rake face (surface immediately below the apex of the thread in the figure) almost entirely peeled off in its portion extending in a strip from the borderline between the relief surface (apex of the thread shown in the figure) and the rake face. For Tool 2 of the invention, as shown in FIG. 7(b), the hard film on each rake face (surface immediately below the apex of the thread in the figure) peeled off in a spotted pattern. For Comparative Tool, as shown in FIG. 7(c), the hard film on each rake face (surface immediately below the apex of the thread in the figure) did not peel at all. This indicates Tools 2 and 1 of the invention have a higher ability to prevent the formation of long continuous chips than Comparative Tool and Tool 2 of the invention, respectively.

What is claimed is:

1. A rotary cutting tool comprising a body having a relief surface (6) and a rake face (7) which is connected to said relief surface (6), wherein an oxide film (9) is formed on said rake face (7) by oxidizing the surface of the body, the oxide film (9) being absent from the relief surface (6), and wherein a hard film (8) is formed on said relief surface (6) and said oxide film (9), said hard film (8) comprising a metal carbide, a metal nitride, a metal carbonitride, or a solid solution thereof.

2. The rotary cutting tool of claim 1 wherein said rake face (7) is matt-finished.

3. The rotary cutting tool of claim 2 wherein said rotary cutting tool is a tap.

4. The rotary cutting tool of claim 1 wherein said rotary cutting tool is a tap.

5. A method of manufacturing a rotary cutting tool comprising a body (10), said method comprising the steps of forming a rake face (7) on said body (10), oxidizing, after forming the rake face, a portion of the surface of the body including said rake face (7) to form an oxide film thereon, cutting, after forming said oxide film, an outer periphery of said body (10) to form a relief surface (6), coating, after forming the relief surface, a portion of the surface of the body including said relief surface (6) with a metal carbide, a metal nitride, a metal carbonitride, or a solid solution thereof.

6. The method of manufacturing a rotary cutting tool of claim 5 wherein before forming said oxide film, said rake face (7) is roughened by a matt finish step.

7. The method of manufacturing a rotary cutting tool of claim 6 wherein said matt finish step comprises the step of roughening the rake face (7) by shot blasting.

8. The method of manufacturing a rotary cutting tool of claim 7 wherein said rotary cutting tool is a tap.

9. The method of manufacturing a rotary cutting tool of claim 6 wherein said rotary cutting tool is a tap.

10. The method of manufacturing a rotary cutting tool of claim 5 wherein said rotary cutting tool is a tap.

* * * * *